Figure 1:
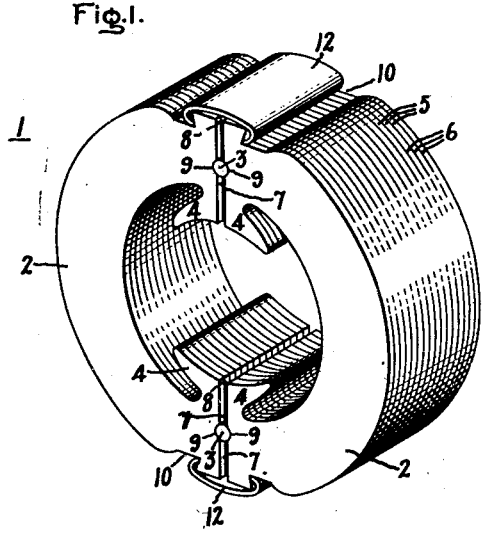

March 28, 1950  C. A. THOMAS  2,502,185

STATOR FOR UNIVERSAL ELECTRIC MOTORS

Filed March 29, 1949

Inventor:
Charles A. Thomas,
by *Brarell F. Mack*
His Attorney.

Patented Mar. 28, 1950

2,502,185

UNITED STATES PATENT OFFICE 2,502,185

STATOR FOR UNIVERSAL ELECTRIC MOTORS

Charles A. Thomas, Fort Wayne, Ind., assignor to General Electric Company, a corporation of New York Application March 29, 1949, Serial No. 84,088

4 Claims. (Cl. 171—209)

My invention relates to dynamoelectric machines, and more particularly to dynamoelectric machines of the commutator type having stator members provided with salient field poles. More specifically, the invention relates to universal electric motors, for operation on both alternating current and direct current, of the type having a salient pole stator member in which the magnetic structure is arranged to compensate for the armature reaction of the rotor member.

In commutator-type dynamoelectric machines it is necessary, for maximum efficiency, to effect substantial neutralization of the armature reaction at the point of commutation. This is especially important for universal motors which must operate on either alternating or direct current. Various means are employed to neutralize the armature reaction of such a motor, among which is the method of constructing the stator in a manner such that the field magnet structure of the stator automatically compensates for the armature reaction. One form of such a construction compensated stator has a magnetic structure which is divided by a layer of non-magnetic material through the center of each field pole along a plane coinciding with the center line of the motor. This construction permits approximately the same air gap flux as if the field poles and magnetic structure were not divided but provides a high reluctance path for armature reaction flux through the magnetic structure of the stator, thus substantially neutralizing the armature reaction.

It is an object of this invention to provide an improved type of construction for construction compensated stator members of the divided pole type.

It is a further object of the invention to provide a type of construction for stator members of this type which is simple and inexpensive.

A still further object of my invention is the provision of a form of construction for stator members of the divided pole type which is readily adaptable to mass production techniques and procedures.

In carrying out my invention in one form, I provide a stator member for a dynamoelectric machine in which the magnetic structure is composed of a substantially circular yoke of laminated magnetic steel divided into two semi-circular segments. On opposite sides of the center line of the magnetic yoke, two projections extend radially inward from the yoke to form two field poles. Each such polar projection and the portion of the yoke from which it projects is split along a plane which coincides with the center line of the yoke. Each split surface of the yoke along this plane has a recess parallel to the center line and extending completely across the split surface in which is located a non-magnetic spacer. These spacers provide a magnetic separation between the two halves of each field pole and simultaneously divide the entire magnetic structure into two substantially semi-circular yoke segments having two half-pole projections on each. On the outer periphery of the circular yoke on each side of each end of the gap between the yoke segments is a recess parallel to the center line adapted to contain one side of a spring clip retaining member. A spring clip of non-magnetic material is positioned at each end of the gap in these recesses to join the two segments of the magnetic yoke and retain in position the laminations of which they are composed.

Figure 2:
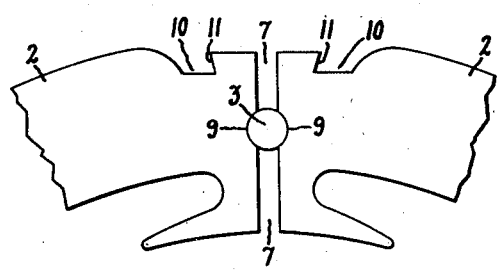
Figure 3:
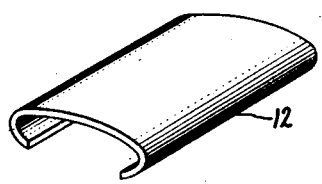
Figure 4:
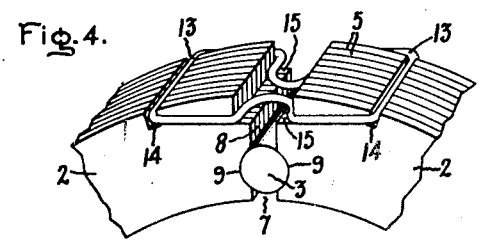

For a more complete understanding of my invention, reference should be had to the accompanying drawing, Fig. 1 of which is a perspective view of a stator member embodying my invention; Fig. 2 is a partial view in elevation of the stator shown in Fig. 1; Fig. 3 is a perspective view of a non-magnetic spring clip which is used to join the yoke segments of the stator member shown in Fig. 1; while Fig. 4 illustrates one modification of my invention.

Referring to Fig. 1 of the drawing, a stator member in which one preferred form of my invention is incorporated is designated generally by the numeral 1. The stator 1 has a substantially circular magnetic yoke portion composed of two duplicate yoke segments 2 separated by non-magnetic spacers 3. The substantially semi-circular yoke segments 2 have two radially inward projections 4, each of which forms half of a salient field pole. Taken together, two adjacent, closely spaced, but slightly separated projections 4 form a field pole adaptable for the location thereon of a suitable exciting winding (not shown).

Yoke segments 2 and their inward projections 4 are laminated, being made of a plurality of relatively thin arcuate flat sheets 5 of magnetic material, preferably steel. The flat sheets 5 are perpendicular to the center line of stator member 1, with adjacent sheets being preferably separated by a thin layer 6 of electrically insulating material in order to substantially prevent eddy currents due to alternating magnetic flux in the stator magnet structure.

Yoke members 2 and polar projections 4 thereon are separated by diametrically opposite gaps, or spaces 7 on each side of the center line of stator 1. The gaps 7 are coplanar, with the plane along which they lie coinciding with the center line of stator 1 and the center lines of the field poles, thus dividing field poles 4, 4 into two equal portions and the circular magnetic yoke into two equal segments with each such segment 2 having as a part thereof two polar projections 4.

Each inner surface 8 of a yoke segment 2 which faces a similar surface on the other like segment has a longitudinal recess 9 extending completely across surface 8 adapted to contain in conjunction with a similar recess in the opposing like segment a non-magnetic spacer member. Rod-like spacers 3, made of non-magnetic material such as aluminum, stainless steel or bronze and also extending completely across surfaces 8, are positioned between opposing surfaces of yoke segments 2 in recesses 9, thus magnetically separating the two magnetic yoke segments 2.

On the outer periphery of the circular yoke 2, 2 are recesses 10 on each side of each outer radial terminus of gaps 7; these recesses which extend completely across the outer surface of the yoke are best seen in Fig. 2 of the accompanying drawing. The surface 11 of each recess 10, which is closest to gap 7, is tapered inwardly toward gap 7 from the top to the bottom of the recess to engage a non-magnetic spring clip retaining member. A spring clip 12, having substantially the same curvature as the outer surface of magnetic yoke 2, 2 with inwardly curved side portions, as illustrated in Fig. 3, engages surfaces 11 of a pair of recesses 10 in the manner shown in Fig. 1. The retaining members or spring clips 12 are of non-magnetic material such as brass or stainless steel and extend completely across the outer surface of the yoke 2, 2. They serve to join yoke segments 2 and simultaneously to retain in position the laminations 5 of which each yoke segment 2 is made. The dimensions and spring characteristics of clips 12 are such that yoke segments 2 are held securely against spacers 3.

A modification of my invention is illustrated by Fig. 4 on the accompanying drawing, in which like numerals represent like parts with Fig. 1. In this modification, yoke segments 2 and laminations 5 of which they are composed, are held in position by a wire spring 13 instead of by clip 12. Like clip 12, spring 13 is of non-magnetic material in order to maintain the magnetic separation between yoke segments 2. As indicated in Fig. 4, yoke segments 2 are changed somewhat in this modification to accommodate spring 13, suitable recesses 14 being provided therefor in the outer surface of yoke segments 2, and indentations 15 being provided adjacent to the end of gap 7 to accommodate the inwardly curved center portions of spring 13.

While the stator member 1 of the drawing has two polar projections 4, 4, it will be readily apparent that this construction is equally applicable to multi-polar stators having four or more poles. Furthermore, while a laminated magnetic structure is shown, it will be readily understood that yoke segments of solid magnetic material may be used. A stator constructed in accordance with my invention is especially applicable to universal motors but may be used also for other commutator type dynamoelectric machines including series, shunt, and compound wound.

While I have illustrated and described one preferred embodiment of my invention and one modification thereof, many additional modifications will occur to those skilled in the art and, therefore, it should be understood that I intend to cover by the appended claims any such modifications which fall within the true spirit and scope of my invention.

What I claim as new and desire to secure by Letters Patent of the United States is:

1. A stationary member for a dynamoelectric machine comprising a substantially circular magnetic yoke, a polar projection extending radially inward from said yoke, a second polar projection diametrically opposite said first projection and extending radially inward from said yoke, said yoke and said first-named and said second-named projections being split along a diameter of said yoke extending substantially through the centers of said first-named and said second-named projections forming two substantially semi-circular yoke segments, a spacer of non-magnetic material positioned between each of the adjacent split surfaces of said yoke segments separating them magnetically whereby a path of high reluctance is provided for armature reaction flux, each yoke segment having a recess formed in the outer surface thereof adjacent the outer radial edge of each split surface, and a spring clip member respectively engaging the recesses on each side of each of said adjacent split surfaces for holding said yoke segments together to form a unitary structure.

2. An armature reaction compensated stator member for a commutator type motor, said stator member comprising a substantially circular magnetic yoke portion, a projection extending radially inward from said yoke to form one field pole, a diametrically opposite second projection extending radially inward from said yoke to form a second field pole, said yoke portion including said first-named projection and said second-named projection being divided by an air gap along a plane coinciding with the center line of said yoke and passing through the centers of said first-named projection and said second-named projection to form two yoke segments, each of said segments having a groove parallel to said center line in each of the surfaces adjacent said gap adapted to contain a portion of a spacer member, a non-magnetic spacer member positioned between each of said adjacent surfaces of said yoke segments in said grooves, each of said yoke segments having a recess formed in the outer peripheral surface thereof parallel to said center line adjacent the outer radial terminus of each gap, and a curved spring clip retainer member respectively engaging the recesses on each side of each gap for joining said segments.

3. In a commutator electric motor of the universal type for operation on either alternating current or direct current, an armature reaction compensated stator comprising two combination magnetic yoke and field pole members substantially semi-circular in form positioned to form a substantially circular outer surface, each such yoke and pole member comprising a plurality of laminations of magnetic sheets, portions of each such yoke and pole member forming half of each of two inwardly projecting magnetic field poles, non-magnetic spacer members positioned between said two yoke and pole members, the two said combination yoke and pole members forming jointly two opposite field pole projections magnetically divided by said spacers and by the resulting air spaces between said spacers along a plane through the center line of said yoke, each of said yoke members having recesses formed in the outer surface thereof respectively adjacent the ends of said air spaces, and retainer members respectively engaging adjacent pairs of recesses on said yoke members to join said two yoke and pole members and maintain in position the laminations of which said yoke and pole members are comprised.

4. In a commutator type dynamoelectric machine, an armature reaction compensated stator comprising a plurality of substantially identical combination yoke and pole members positioned to form a circular magnetic yoke, radially inward extending portions of each said yoke and pole member forming half of each of two magnetic field poles, each combination yoke and pole member having a groove in each radial surface thereof adjoining a corresponding surface on the adjacent yoke and pole member, a plurality of non-magnetic spacers positioned between adjacent yoke and pole members engaging said grooves, said yoke and pole members forming a plurality of field pole projections around the inner surface of said magnetic yoke divided radially by said spacers whereby a high reluctance path is formed for armature reaction flux, each said yoke and pole member having a recess in the outer surface thereof adjacent each division between said yoke and pole member and adjacent yoke and pole members adapted to contain a portion of a resilient retainer member, and a plurality of resilient retainer members respectively engaging the recesses on both sides of each of said divisions for holding said yoke and pole members together to form a unitary stator structure.

CHARLES A. THOMAS.

No references cited.